(12) United States Patent
Huang et al.

(10) Patent No.: US 7,397,160 B2
(45) Date of Patent: Jul. 8, 2008

(54) INSULATION DEVICE FOR LINEAR MOTOR

(75) Inventors: Lieh-Feng Huang, Taichung (TW); Chia-Ming Chang, Taichung (TW)

(73) Assignee: Hiwin Mikrosystem Corp., Taichung (TW)

( * ) Notice: Subject to any disclaimer, the term of this patent is extended or adjusted under 35 U.S.C. 154(b) by 32 days.

(21) Appl. No.: 11/599,034

(22) Filed: Nov. 14, 2006

(65) Prior Publication Data

US 2008/0111439 A1 May 15, 2008

(51) Int. Cl.
*H02K 41/00* (2006.01)

(52) U.S. Cl. .......................................... 310/214; 310/12

(58) Field of Classification Search ................. 310/214, 310/254, 179, 12–15, 43; 336/15
See application file for complete search history.

(56) References Cited

U.S. PATENT DOCUMENTS

| 4,454,439 | A * | 6/1984 | Okamoto et al. | 310/179 |
| 6,664,703 | B2 * | 12/2003 | Oketani et al. | 310/254 |

* cited by examiner

*Primary Examiner*—Thanh Lam
(74) *Attorney, Agent, or Firm*—Charles E. Baxley

(57) ABSTRACT

An insulation device for being assembled in a linear motor is primarily made through molding a sheet insulation material into an insulation module with the shape harmonized with the shape of an iron core of a linear motor. Thus, coil wildings can be indirectly wrapped around the iron core with the insulation module positioned intermediately and thereby a linear motor with perfect insulation treatment between the iron and coil windings is achieved.

6 Claims, 5 Drawing Sheets

INSULATION DEVICE FOR LINEAR MOTOR

BACKGROUND OF THE INVENTION

1. Technical Field

The present invention relates to linear motors, and more particularly, to an insulation device for being assembled in a linear motor to keep the iron core insulated from the coil windings thereof.

2. Description of Related Art

As can be seen in FIG. 2, an iron core 90 constitutes the principal part of a forcer of a linear motor. Such an iron core 90 is typically made by laminating silicon steel sheets integratedly to form an appearance that comprises a base portion 92 whereon a plurality of teeth 94 and indentations 96 are alternatively aligned. To accomplish the iron core 90, a coil winding is further provided to encircle the teeth 94 while being accommodated in the indentations 96. Between the iron core 90 and coil winding, proper insulation treatment is essential to prevent short circuiting or interference between the iron core 90 and coil winding.

In prior art, insulation treatment is practiced by inserting sheet made of insulation material, such as insulation paper between the iron core 90 and coil winding during arranging the coil winding. However, such conventional insulation treatment may be deficient by following reasons.

1. The entire insulation treatment has to be operated manually and respectively for every single tooth of the iron core, and such work can consume enormous human labor.

2. As it is difficult to make an insulation papers used in prior art positioned properly during wrapping the iron coil with the coil winding, the wrapping operation must be conducted with greatest attention and any slight mistake may cause malposition of the insulation papers. Thus, the processing efficiency of the insulation treatment is substantially limited.

SUMMARY OF THE INVENTION

The present invention has been accomplished under the circumstances in view to provide a modulized insulation device for a linear motor.

It is one object of the present invention to provide an insulation device, which provides competent insulation between an iron core and coil windings wrapped therearound and helps preventing short circuiting.

It is another object of the present invention to provide an insulation device, which can be simply and promptly assembled to an iron core of a linear motor and efficiently facilitate saving human labor.

It is still another object of the present invention to provide an insulation device, which can be securely positioned on an iron core of a linear motor and therefore the processing efficiency of the insulation treatment can be significantly increased.

BRIEF DESCRIPTION OF THE DRAWINGS

The invention as well as a preferred mode of use, further objectives and advantages thereof, will best be understood by reference to the following detailed description of an illustrative embodiment when read in conjunction with the accompanying drawings, wherein.

DETAILED DESCRIPTION OF THE PREFERRED EMBODIMENT

Please refer to FIGS. 1 to 5, which describe a preferred embodiment of the present invention. It is to be understood that the recited figures and embodiment are for illustrating and not intended to limit the structure of the present invention.

Figure 2:
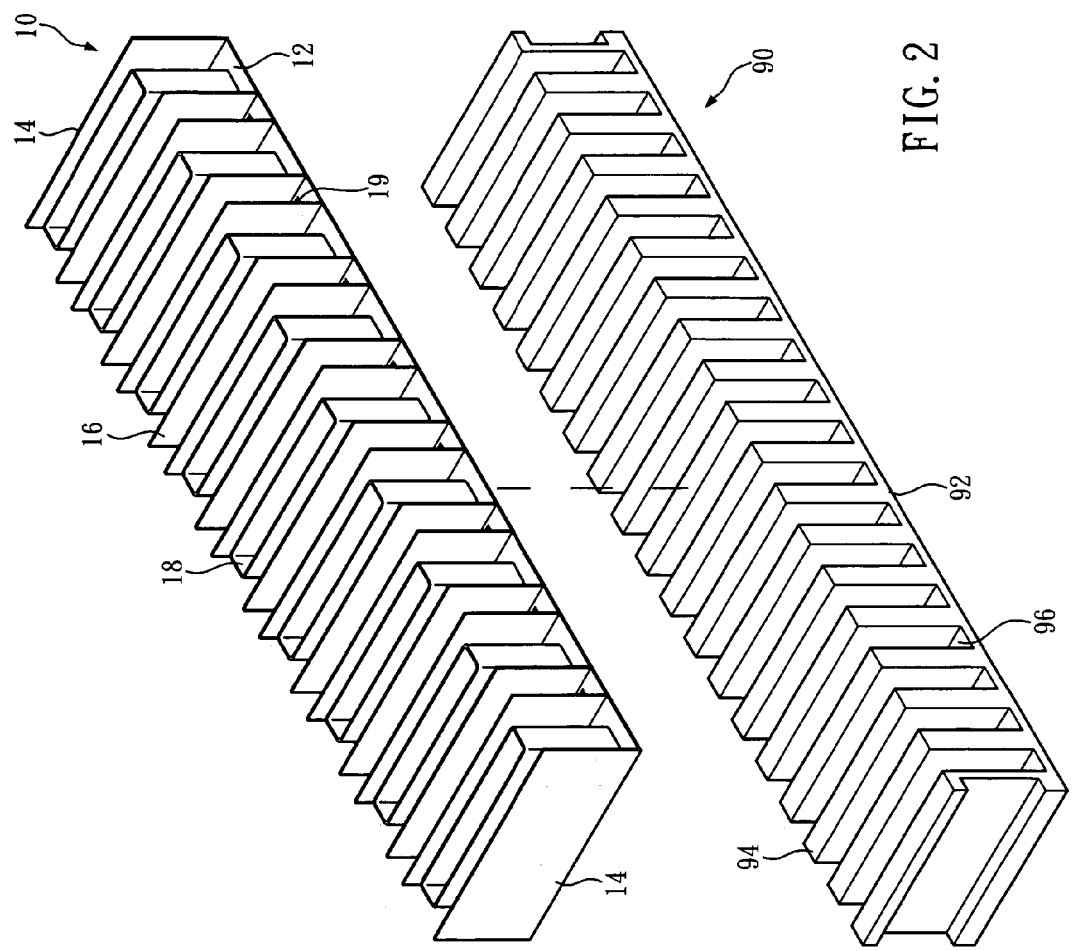
FIG. 2 is a schematic drawing showing the assembling relationship between the disclosed insulation device and a forcer core of the linear motor.

Referring to FIG. 2, as described above, a iron core 90 of a linear motor is typically made by laminating silicon steel sheets integratedly to form an appearance that comprises a base portion 92 whereon a plurality of teeth 94 and indentations 96 are alternatively aligned.

Figure 1:
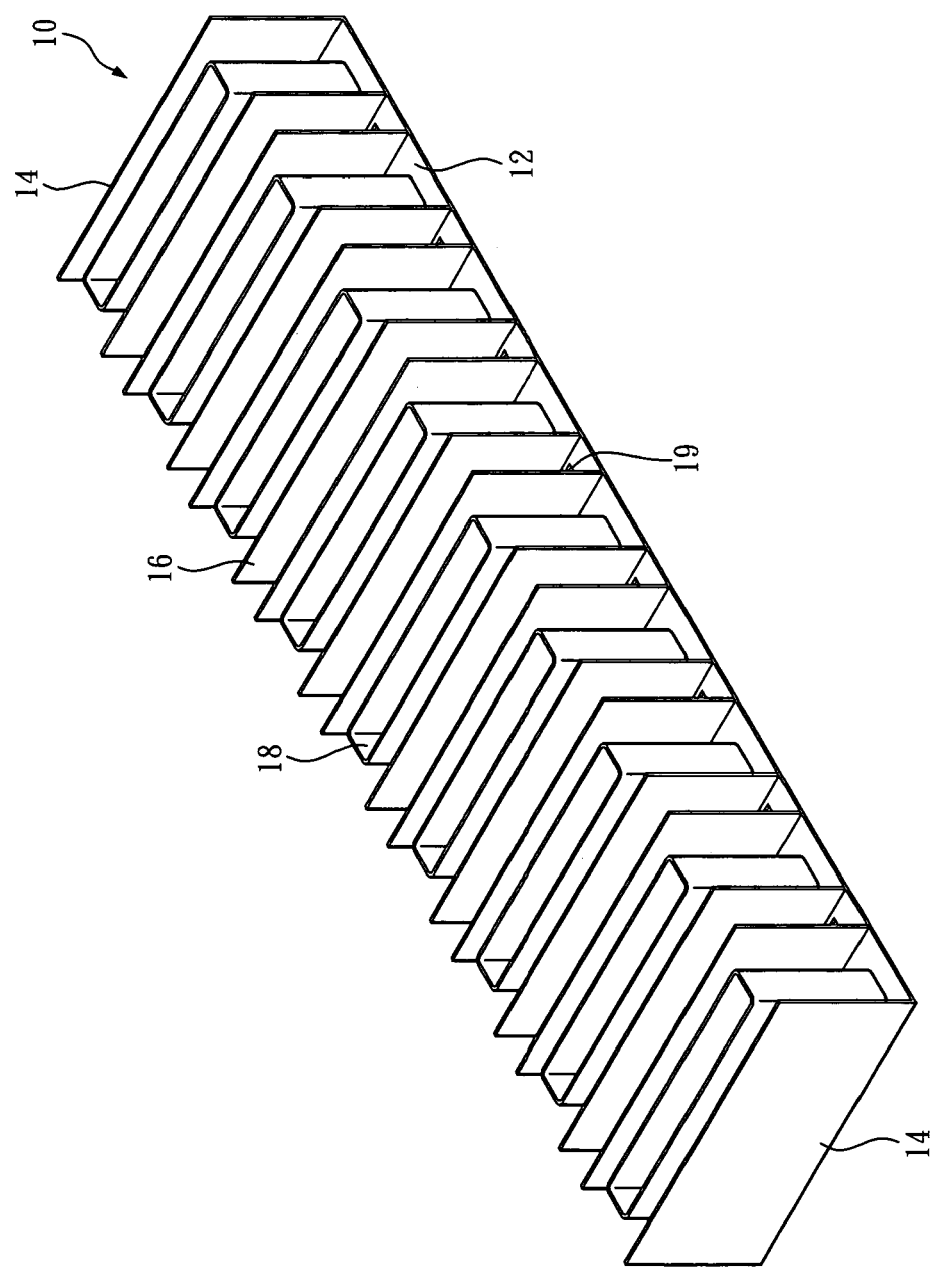
FIG. 1 is a perspective view of an insulation device for a linear motor according to the present invention.

Accordingly, the disclosed insulation device, as shown in FIGS. 1 and 2, is made through molding a sheet insulation material into an insulation module 10 with the shape harmonized with the shape of an iron core 90 of a linear motor with any known plastic forming technology. In one embodiment of the present invention, the insulation device is formed by means of technology of vacuum tray as a integrated insulation module 10 which comprises a baseplate 12, a pair of sidewall 14, a plurality of partitions 16, a plurality of enclosures 18 each having an opening and a plurality of slots 19 wherein the enclosures 18 and slots 19 of the insulation module 10 are positioned corresponding to a plurality of teeth 94 of the iron core 90.

As the present linear motor of this particular embodiment is subject to a three-phase linear motor, the coil windings are provided for each two of the adjacent teeth 94. Thus, in the exemplificative insulation module 10, for each two of the adjacent teeth 94, one tooth 94 is furnished with an enclosure 18 and a pair of partitions 16 arranged at the opposite sides with a predetermined interval (for accommodating the coil winding) with the enclosure 18 respectively while the other tooth 94 is provided with a slot 19 and a pair of partitions 16 arranged closely at the opposite sides of the slot 19.

As can be understood in FIG. 2, when the insulation module 10 and the forcer core iron core 90 are assembled, the teeth 94 of the forcer core iron core 90 can either be enclosed by the enclosures 18 or sandwiched by the partitions 16, and therefore a full insulation treatment can be accomplished.

Figure 3:
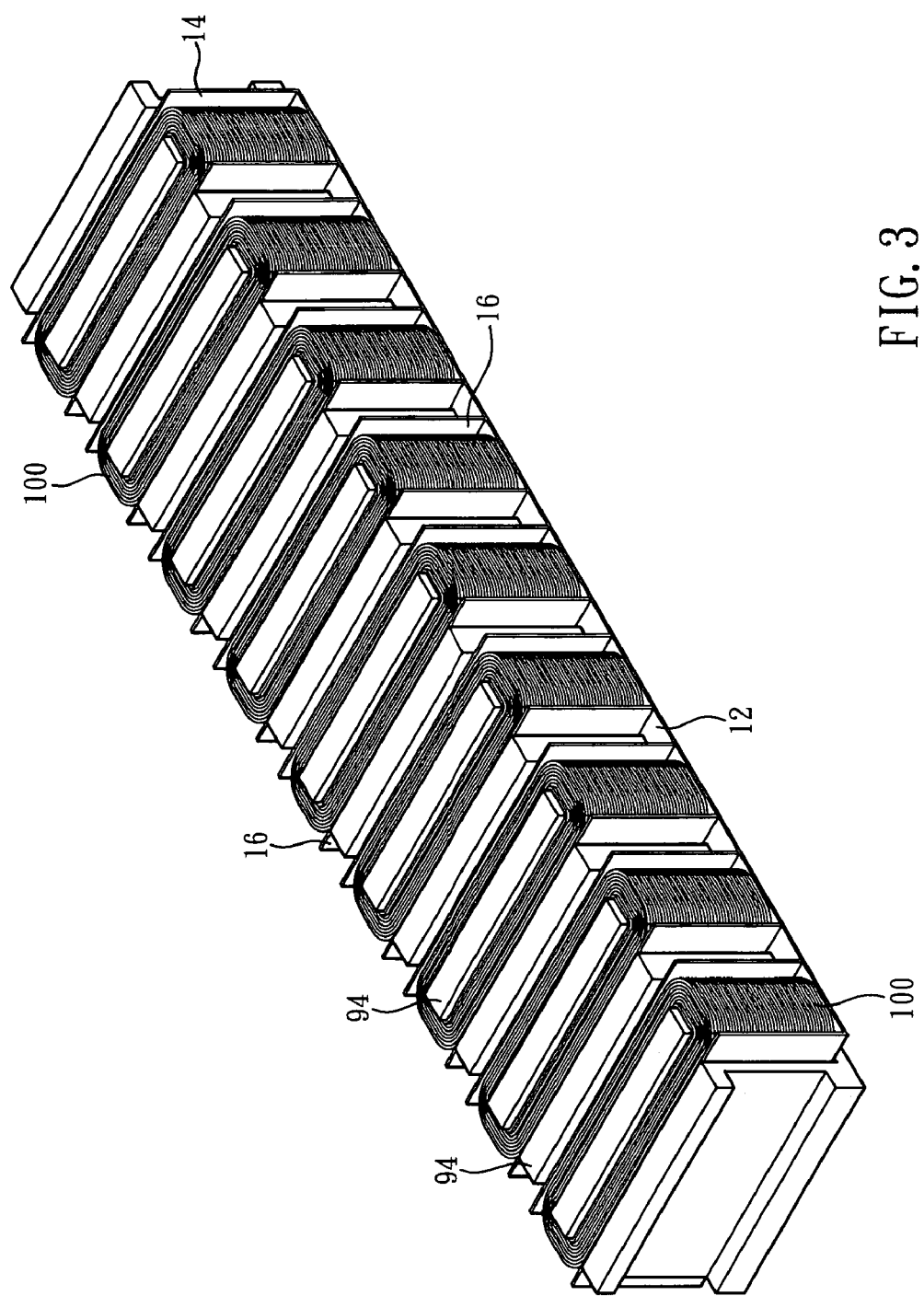
FIG. 3 is an assembly drawing according to FIG. 2 showing the insulation device assembled with the forcer core.
Figure 4:
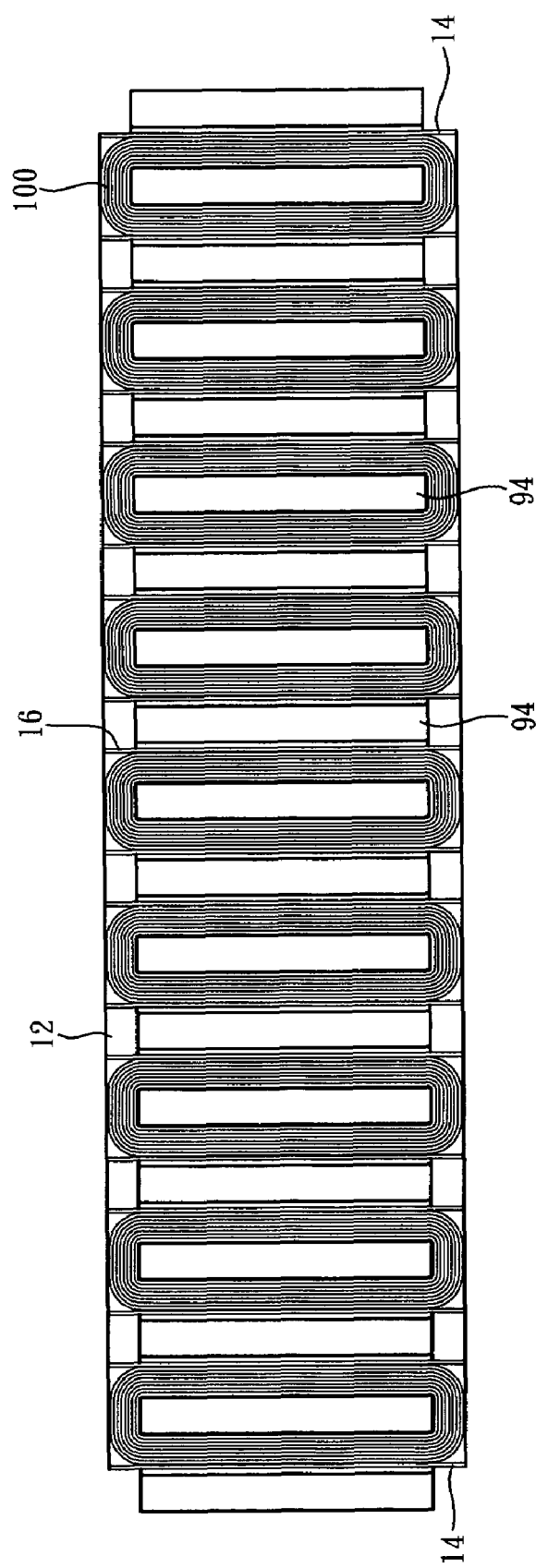
FIG. 4 is a top view describing the finished forcer core.
Figure 5:
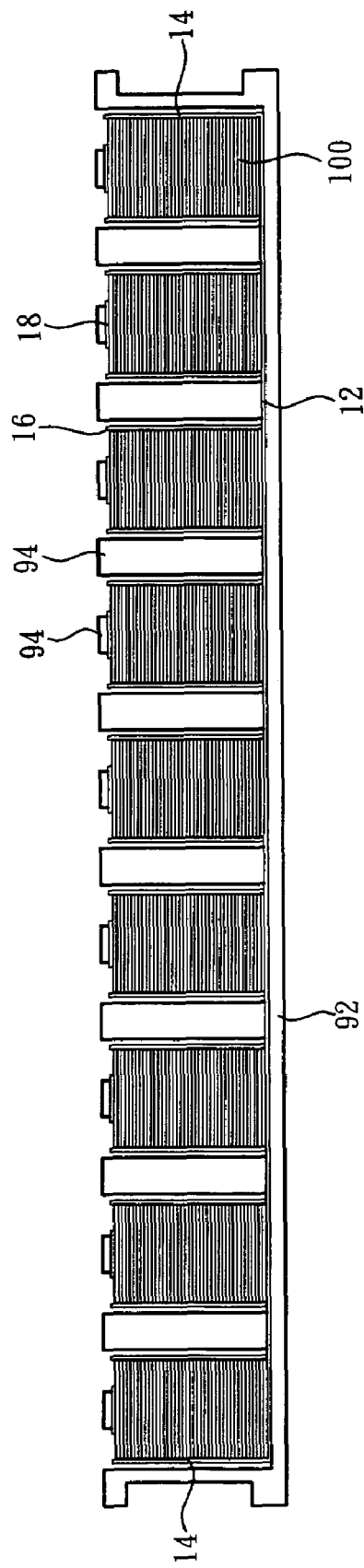
FIG. 5 is a lateral view of the finished forcer cote.

Afterward, as illustrated in FIGS. 3 to 5, since the shapes of the enclosures 18 and slots 19 are fitting for the teeth 94 of the forcer core iron core 90, the insulation module 10 can be securely positioned on the forcer core iron core 90 without moving when wrapping the coil winding 100 over the enclosures 18 enclosing the teeth 94.

Whereupon, the disclosed insulation module 10 can provide competent insulation between an iron core 90 and coil windings 100 wrapped therearound and helps preventing short circuiting. Also, the insulation module 10 can be simply and promptly assembled to an iron core 90 of a linear motor and efficiently facilitate saving human labor. Meantime, the insulation module 10 can be securely positioned on an iron core 90 of a linear motor and therefore the processing efficiency of the insulation treatment can be significantly increased.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. It will be understood by one of ordinary skill in the art that numerous variations will be possible to the disclosed embodiments without going outside the scope of the invention as disclosed in the claims.

What is claimed is:

1. An insulation device for a linear motor comprising:
   a base plate;
   a plurality of pairs of sidewalls with said sidewalls projecting from said base plate;
   a plurality of enclosures, with said enclosures projecting from said base plate, with each of said enclosures disposed between and spaced away from a pair of said side walls.

2. An insulation device for a linear motor as claimed in claim 1 wherein each of said enclosures further comprises:
   an opening.

3. An insulation device for a linear motor as claimed in claim 1 further comprising:
   a plurality of slots with each of said plurality of slots defined by a pair of side walls.

4. An insulation device for a linear motor as claimed in claim 1 wherein said base plate comprises:
   a width dimension and wherein each of said sidewalls extend substantially across said width dimension and wherein said enclosures extend across said base plate to an extent less than said width dimension of said base plate.

5. An insulation device for a linear motor having a core with a plurality of teeth and a plurality of windings comprising:
   a base plate;
   a plurality of pairs of sidewalls with said sidewalls projecting form said base plate;
   a plurality of enclosures with said enclosures projecting from said base plate and with each of said enclosures disposed between and spaced away from a pair of sidewalls and with selected teeth disposed projecting, one each, into an enclosure and with each of said windings disposed surrounding an enclosure.

6. An insulation device for a linear motor as claimed in claim 1 wherein said device comprises:
   a plastic material.

* * * * *